United States Patent
Floyd

(10) Patent No.: US 9,224,128 B2
(45) Date of Patent: Dec. 29, 2015

(54) ENERGY INFORMATION EXCHANGE

(75) Inventor: Gregory Ray Floyd, McDonough, GA (US)

(73) Assignee: Southern Company Services, Inc., Atlanta, GA (US)

(*) Notice: Subject to any disclaimer, the term of this patent is extended or adjusted under 35 U.S.C. 154(b) by 662 days.

(21) Appl. No.: 13/109,177

(22) Filed: May 17, 2011

(65) Prior Publication Data

US 2012/0296869 A1    Nov. 22, 2012

(51) Int. Cl.
*G06F 17/00* (2006.01)
*G06Q 10/10* (2012.01)
*G06Q 50/06* (2012.01)

(52) U.S. Cl.
CPC ................ *G06Q 10/10* (2013.01); *G06Q 50/06* (2013.01)

(58) Field of Classification Search
CPC ................................ G06F 17/30; G06Q 10/10
USPC .................................................. 707/600–899
See application file for complete search history.

(56) References Cited

U.S. PATENT DOCUMENTS

| | | | | |
|---|---|---|---|---|
| 8,355,827 B2* | 1/2013 | Egnor et al. | ................... | 700/291 |
| 8,473,106 B2* | 6/2013 | Clark et al. | ................... | 700/276 |
| 8,843,334 B2* | 9/2014 | Donaldson et al. | ............. | 702/66 |
| 2008/0074284 A1* | 3/2008 | Edwards et al. | ......... | 340/870.02 |
| 2008/0177678 A1* | 7/2008 | Di Martini et al. | ........... | 705/412 |
| 2010/0127889 A1* | 5/2010 | Vogel et al. | .............. | 340/870.02 |
| 2011/0063126 A1* | 3/2011 | Kennedy et al. | ......... | 340/870.02 |

* cited by examiner

*Primary Examiner* — Isaac M Woo
(74) *Attorney, Agent, or Firm* — Thomas | Horstemeyer, LLP

(57) ABSTRACT

Disclosed are various embodiments for facilitating data synchronization in a utility computing environment. A data synchronization application can monitor source systems in such an environment and generate periodic change sets that correspond to data that has changed in the various source systems. Destination systems can subscribe to change sets and receive the appropriate change sets by monitoring flags that the data synchronization application can set. Various classes of change sets that correspond to data within a particular change set can also be generated.

24 Claims, 4 Drawing Sheets

ENERGY INFORMATION EXCHANGE

BACKGROUND

Utility computing environments can involve storage, analysis and manipulation of large amounts of data. As one example, a utility computing environment can be tasked with monitoring usage information for millions of utility meters transmitting usage data on a periodic or real time basis. The various meters can be associated with various customer accounts, account types, service plans, and other categories. Additionally, bills based upon this usage information must be generated for the appropriate customers using appropriate rate information associated with a customer account. Additionally, outage and maintenance data related to meters, transmission lines, or other utility assets are also managed within a utility computing environment. Accordingly, large amounts of data can be exchanged among various systems in a utility computing environment.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure facilitate synchronization of source systems in a utility computing environment with destination systems that utilize data from source systems. In some embodiments of the disclosure, source systems can include advanced metering infrastructure (AMI) metering devices, head-ends, portals, etc. Source systems can also include customer information systems, data stores, databases, etc. Source systems can also include billing systems, maintenance systems, logistics systems, systems providing data about metering devices, and other systems that provide data to other systems in a utility computing environment. For example, a destination system can include a billing application that generates bills associated with a customer account for a particular billing period. Accordingly, such an application can generate a bill from data about energy usage for the billing period as detected by one or more AMI metering devices. Additionally, the billing application can use the energy usage information together with data about a rate plan associated with the customer account.

As another example, a destination system can include a marketing application that initiates electronic, mail, and/or other forms of marketing information to a customer when the customer opens an account, modifies a rate plan structure associated with a customer account, or undergoes any other change that may signify an opportunity to market additional and/or alternative services to the customer. Accordingly, it may be desirable to provide such a marketing application with rate plan information associated with various customer accounts so that these opportunities can be identified.

Embodiments of the disclosure can improve the efficiency of the exchange of data between source systems and destination systems by generating change sets that represent data in the various source systems that has changed since the last generation of such a change set. Additionally, these change sets can include one or more flags that can be set and that describe the type of data contained within the change set as well as the type of data that has changed since the last generation of a change set.

Figure 1:
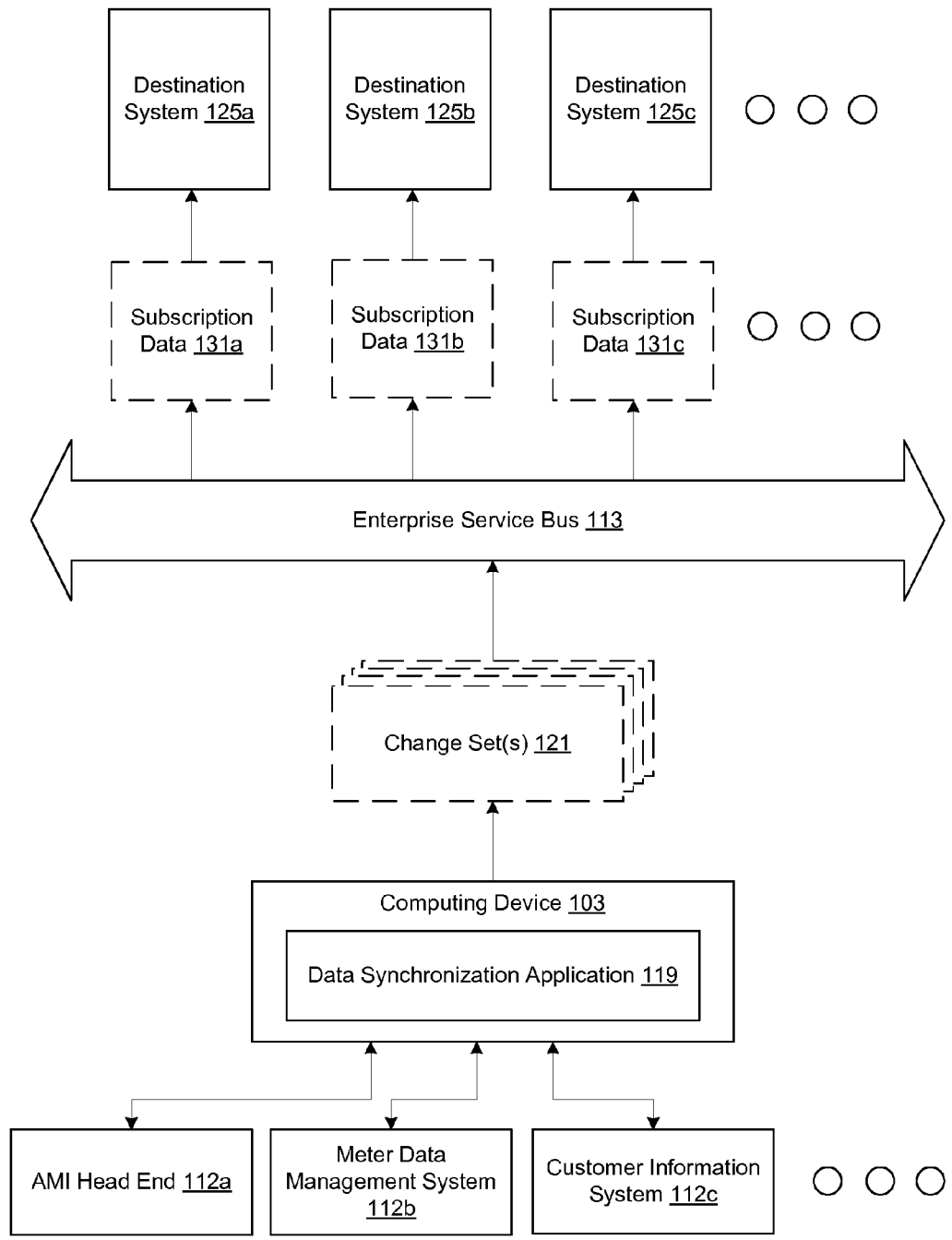
FIG. 1 is a drawing of a utility metering and computing environment in which a data synchronization application can be implemented according to various embodiments of the present disclosure.

Accordingly, with reference to FIG. 1, shown is one example of a utility computing environment 100 according to various embodiments. The utility computing environment 100 includes a computing device 103 in communication with various systems that facilitate the operation of a utility environment. The computing device 103 can be in communication with one or more other systems over an appropriate network. Such a network may comprise, for example, the Internet, intranets, wide area networks (WANs), local area networks (LANs), wireless networks, or other suitable networks, etc., or any combination of two or more such networks. The computing device 103 can be in communication with various source systems 112 that house data from which change sets can be generated for communication to destination systems in the utility computing environment.

The computing device 103 is configured to execute a data synchronization application 119 that can generate change sets 121 corresponding to data that has changed in one or more source systems 112 in the utility computing environment. A change set 121 can include one or more flags from which destination systems 125 can determine whether a change set 121 contains data that is relevant for the purposes of the destination system 125. The data synchronization application 119 can, on a periodic basis (e.g., monthly, etc.) generate a change set 121 that corresponds to data in one or more of the source systems 112 that has changed. In one embodiment, the data synchronization application 119 can generate a change set 121 that corresponds to data that has changed since the last generation of a change set 121 by the data synchronization application 119. In this sense, the change set 121 can include only data that has changed rather than additional and duplicative data. The generation of change sets 121 by the data synchronization application 119 as well as distribution of a change set 121 to destination systems 125 is described in further detail below.

One example of a source system in the environment can include an AMI head-end 112, which can further be in communication with an AMI metering network that includes various AMI metering devices. The AMI head-end 112 can receive utility usage information from a fleet of utility metering devices, communications towers, etc., that are deployed at various customer premises within the AMI metering network. A metering vendor facilitating deployment of an AMI utility metering environment often provides one or more AMI head-ends 112a which interface with various utility metering devices in an AMI metering network to collect usage data, alarm messages, outage reports and other statistics, values and metrics that can originate from the AMI metering network.

Another example of a source system 112 in the environment can include a meter data management system 112b. The meter data management system 112b can house and manage information related to usage data and events that are imported from the AMI head-end 112a or other systems that manage the data collection in an AMI deployment. Another example of a source system 112 can include a customer information system 112c. The customer information system 112c can include information about customer accounts, including, but not limited to, rate plan information, identifiers for AMI metering devices associated with a customer account, a customer address, billing information, and other data related to customer accounts. A source system 112 can also include any other system not pictured from which data can be retrieved in a utility computing environment.

A source system 112 may comprise, for example, a computing device, a server computer or any other system providing computing capability or resources. Alternatively, a plurality of computing devices may be employed that are arranged, for example, in one or more server banks or computer banks or other arrangements. For example, a plurality of computing devices together may comprise, for example, a cloud computing resource, a grid computing resource, and/or any other distributed computing arrangement. Such computing devices may be located in a single installation or may be distributed among many different geographical locations. Additionally, some components executed on a computing device can be executed in one installation, while other components can be executed in another installation. For purposes of convenience, the computing device is referred to herein in the singular. Even though the computing device is referred to in the singular, it is understood that a plurality of computing devices may be employed in the various arrangements as described above.

Also shown in the utility computing environment 100 of FIG. 1 are one or more destination systems 125. A destination system 125, in some embodiments, can receive data from source systems 112 based on one or more subscription definitions corresponding to the destination system 125. A destination system 125 can include any application or computing device that can be configured to receive data from a source system 112 in the utility computing environment 100. As one example, a destination system 125 can include a billing system that is employed to generate bills based upon energy usage information received from the AMI head-end 112 and/or meter data management system 112b. A destination system 125 can receive subscription data 131 that is based upon a change set 121 generated by the data synchronization application 119 and published in the enterprise service bus (ESB) 113. In one embodiment, the change set 121 can include one or more flags that indicate the type of data included therein. For example, the change set can include a plurality of data records indicating data that has changed during a specified period of time. Additionally, the change set 121 can include at least one flag in each of the records identifying a type of change that has occurred during the specified period of time. In some embodiments, a change set 121 can include a single set of flags that identifies the type of change that has occurred during the specified time period.

Accordingly, a destination system 125 can subscribe to change sets 121 by monitoring flags associated with the change sets 121 to receive certain types of data that has changed within the utility computing environment during a specified time period. In other words, a change set 121 can include data that has changed since the last generation of a change set 121 by the data synchronization application 119. The various ways in which a change set 121 can be generated by the data synchronization application 119 will be described in further detail below.

Also shown in the utility computing environment 100 of FIG. 1 is an ESB system 113 that is in communication with the computing device 103 as well as the other systems in the environment 100. The ESB system 113 can facilitate an enterprise service bus configured to support messaging between the various components shown in the environment of FIG. 1. In other words, the enterprise service bus can act as an intermediary between the source systems 112, the computing device 103 as well as destination systems 125 to facilitate the transmission of data there between. The enterprise service bus may also be referred to as a "message broker" or an intermediary program that transforms messages from a one system to another, thereby allowing the systems to send data back and forth to one other. For example, the data synchronization application 119 may generate a change set 121 in an extensible markup language (XML) format over Hypertext Transfer Protocol (HTTP), which can then be transformed by the ESB 113 into plain text or other formats for other systems in the utility computing environment 100. In other words, the ESB 113 provides functionality to support interoperable machine to machine interaction over a network in potentially varying message formats. The specific functionality provided by an ESB 113 should be appreciated to those of ordinary skill in the art, and is not discussed in detail herein.

The computing device 103, source systems 112, destination systems 125, ESB 113, and other systems may comprise, for example, a computing device, a server computer or any other system providing computing capability or resources. Alternatively, a plurality of computing devices may be employed that are arranged, for example, in one or more server banks or computer banks or other arrangements. For example, a plurality of computing devices together may comprise, for example, a cloud computing resource, a grid computing resource, and/or any other distributed computing arrangement. Such computing devices may be located in a single installation or may be distributed among many different geographical locations. Additionally, some components executed on a computing device can be executed in one installation, while other components can be executed in another installation. For purposes of convenience, the computing device is referred to herein in the singular. Even though the computing device is referred to in the singular, it is understood that a plurality of computing devices may be employed in the various arrangements as described above.

Various applications and/or other functionality may be executed in the computing device 103 according to various embodiments. In the depicted non-limiting embodiment, the computing device 103 can execute a data synchronization application 119 that can include various modules that facilitate the functionality described herein. It should be appreciated that the depicted arrangement of a data synchronization application 119 is but one non-limiting example of an arrangement of an embodiment of the disclosure given for ease of depiction as well as discussion herein. It should also be appreciated that embodiments of the disclosure can be implemented in various ways. As one example, the logic of the data synchronization application 119 can be implemented as logic within the framework of a module of the ESB 113. Other variations should be appreciated by a person of ordinary skill in the art.

Now that a general description of the various components in the utility computing environment 100 has been provided, a description of the operation of the various components is provided. As described above, the data synchronization application 119 can generate change sets 121 that contain data from the various source systems 112 in a utility computing environment that has changed during a specified time period. The data synchronization application 119 can generate a change set and publish it on the ESB 113, which can be in communication with the destination systems 125 in the utility computing environment 100. The ESB 113 can be configured to identify flags in the change set 121 and deliver subscription data 131 corresponding to the change set 121 to the appropriate destination system 125 based upon a subscription configuration for the destination system 125. In some embodiments, the destination systems 125 can listen to the ESB 113 for change sets 121 published by the data synchronization application 119, and identify change sets 121 of interest by flags set in the change set 121. In this scenario, the destination systems 125 can extract the change set 121 from the ESB 113 as subscription data 131.

In one embodiment, the data synchronization application 119 can generate four classes of change sets 121 corresponding to data in the utility computing environment 100. One class of a change set 121 can include an energy usage change set that includes regarding energy usage associated with AMI metering devices in an AMI deployment. An energy usage change set can include energy usage for a specified time period. In other words, the energy usage change set can include data records corresponding to various AMI metering devices to the extent the energy usage has changed since the previous generation of an energy usage change set. To generate such a change set 121, the data synchronization application 119 can retrieve data from the AMI head-end 112a, the meter data management system 112b, or other systems in which energy usage information is stored. The energy usage change set can also include a flag that identifies the changes set as an energy usage change set. The flag can be associated with each of the records in a change set and/or in header information associated with the change set. In one embodiment, flags that identify the type of data in a change set can be defined in a 32-bit field, where each bit can correspond to a particular type of flag. In such a scenario, a destination system 125, such as, but not limited to, a billing system, can subscribe to an energy usage change set and receive the change set in order to generate bills or perform other tasks by identifying an energy usage change set by a flag that is set by the data synchronization application 119.

A second class of a change set 121 generated by the data synchronization application 119 can include a device information change set. A device information change set can include information about AMI metering devices that has changed since the last generation of a device information change set. Such device information can include data describing whether a new meter has been installed and/or added to the AMI network, whether a meter has experienced an outage condition and/or a restore condition, or other information about metering devices that may change. Accordingly, a device information change set can be identified by various flags that can be set by the data synchronization application 119. These flags can include, but are not limited to, a meter installation flag, an address change flag, a move-in flag, a move-out flag, a rate change flag, a meter removal flag, an estimated meter reading flag, and other flags associated with device information as can be appreciated. In some embodiments, a combination of one or more flags can be translated by the data synchronization application 119 into another type of flag. As one example, a meter installation flag followed shortly by a meter removal flag for the same meter identifier can be translated into a meter swap flag.

A third class of change set 121 that can be generated by the data synchronization application 119 can include a customer information change set 121. A customer information change set 121 can include customer data that has changed since the last generation of a customer information change set 121. In one embodiment, the data synchronization application 119 can monitor data in a customer information system 112c or any other system that stores customer information and identify data that has changed since the last generation of a change set 121 corresponding to customer accounts. Accordingly, the data synchronization application 119 can identify customer accounts that have changed during a specified period of time. As some examples, the data synchronization application 119 can monitor whether an address associated with the customer account, a rate plan associated with the customer account, or any other data associated with a customer account has changed. Accordingly, the data synchronization application 119 can include the changed data in a customer information change set that includes all changed data since the last generation of a customer information change set.

A fourth class of change set can include a billing determinate change set. A billing determinate change set can include information about rates from which billing statements, financial reports, or other information can be generated. Accordingly, the data synchronization application 119 can monitor data about billing determinates in a source system 112, and generate a billing determinate change set that includes changes to billing determinate data since the last generation of such a change set.

To generate the various classes of change sets described above, in one embodiment, the data synchronization application 119 can monitor a log file, message history database, meter database or other data source in the utility computing environment upon which a change set is based. Accordingly, in some embodiments, the data synchronization application 119 can receive an update notification from a database (e.g., a database trigger notification) that corresponds to a change in data stored in the underlying database. In response, the data synchronization application 119 can generate a change set 121 that can be transmitted to destination systems 125 via the ESB 113. In such a scenario, the data synchronization application 119 can collect update notifications from a database containing data for which a destination system 125 has subscribed to change sets 121, generate a change set 121 containing data that has changed since the last generation of a change set 121, and publish the change set 121 on the ESB 113 with flags set that designate the type of data that has changed. In another embodiment, the data synchronization application 119 can monitor the tail of a log file in a source system 112 that includes data updates for which a destination system 125 has subscribed to change sets 121. As data updates appear in the log file, the data synchronization application 119 can generate a change set 121 and publish the change set 121 on the ESB 113.

As noted above, the data synchronization application 119 can set various flags which allow a destination system 125 and/or the ESB 113 to determine the type of data contained within a change set 121. In other words, the data synchronization application 119 can set one or more flags that designate the type of data contained within a given change set 121. For example, in a device information change set, the data synchronization application 119 can populate the change set with various records containing data that has changed since the previous generation of a device information change set. Accordingly, the change set 121 can include more than one type of data, and the data synchronization application 119 can set more than one flag so that various destination systems 125 can receive the change set 121 for their intended purpose. For example, a marketing application may subscribe to any change set 121 that includes a flag corresponding to a change in a rate plan associated with a customer account. The marketing application may also subscribe to any change set 121 that includes a flag corresponding to the addition of a new customer account to the customer information system 112c. Accordingly, in one embodiment, customer information change set may include records corresponding to both types of data, and may therefore have both flags set by the data synchronization application 119 upon generation of the change set 121.

Figure 2A:
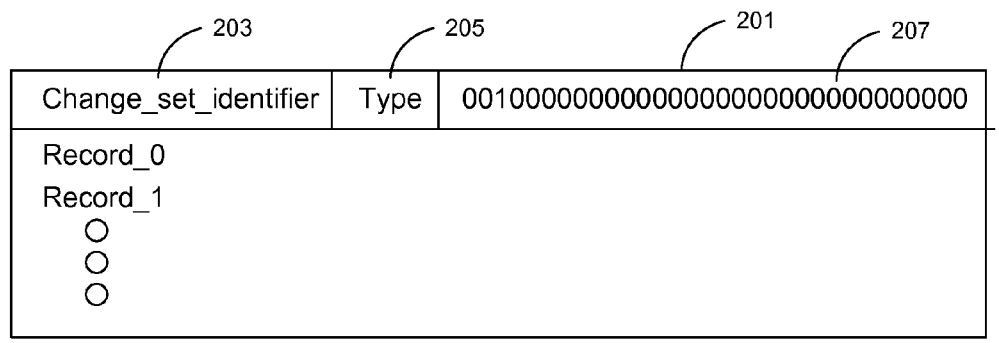
FIGS. 2A-2B are example change sets that can be generated by the data synchronization application in the utility computing environment of FIG. 2 according to various embodiments of the present disclosure.

Reference is now made to FIG. 2A, which depicts one example of a change set 121 that can be generated by the data synchronization application 119. As noted above, the change set 121 can include data records that represent changed data in one or more source systems 112 in the utility computing environment 100. In one embodiment, a change set 121 can include a header 201 that includes various information so that the ESB 113 can route the change set 121 to appropriate destination systems 125. Alternatively, the header can allow the destination systems 125 to examine the change to determine whether the change set 121 contains data of interest to the destination system 125. In the depicted non-limiting example, the header 201 can include an identifier 203 which can uniquely identify the change set 121 relative to other previously and/or subsequently generated change sets 121. The identifier 203 can also sequentially identify the change set 121 so that it can be distinguished relative to previous change sets 121 generated by the data synchronization application 119.

Figure 2B:
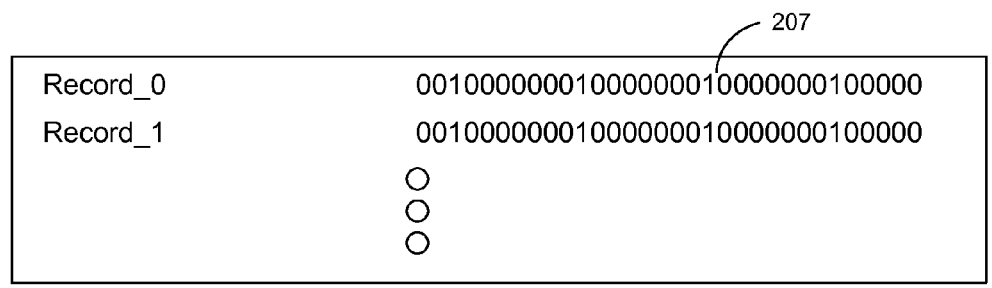

The header 201 can also include a type identifier 205, which can identify the change set type from among the various classes of change sets that can be generated by the data synchronization application 119 that are described above. Additionally, the change set 121 can include a flags 207 that can be set by the data synchronization application 119 upon generation of the change set 121 to describe the various types of data contained therein. In the case of an energy usage change set containing energy usage data pertaining to AMI metering devices, the data synchronization application 119 can set one or more flags indicating that the data contained within the change set contains energy usage data. Accordingly, a destination system 125 subscribing to energy usage change sets can identify that the change set 121 is relevant to energy usage information. FIG. 2B depicts an alternative example of a change set 121 that can be generated by the data synchronization application 119. The example shown in FIG. 2B illustrates an example of a change set 121 that includes data records that are each associated with a set of flags 207 rather than in a header.

Figure 3:
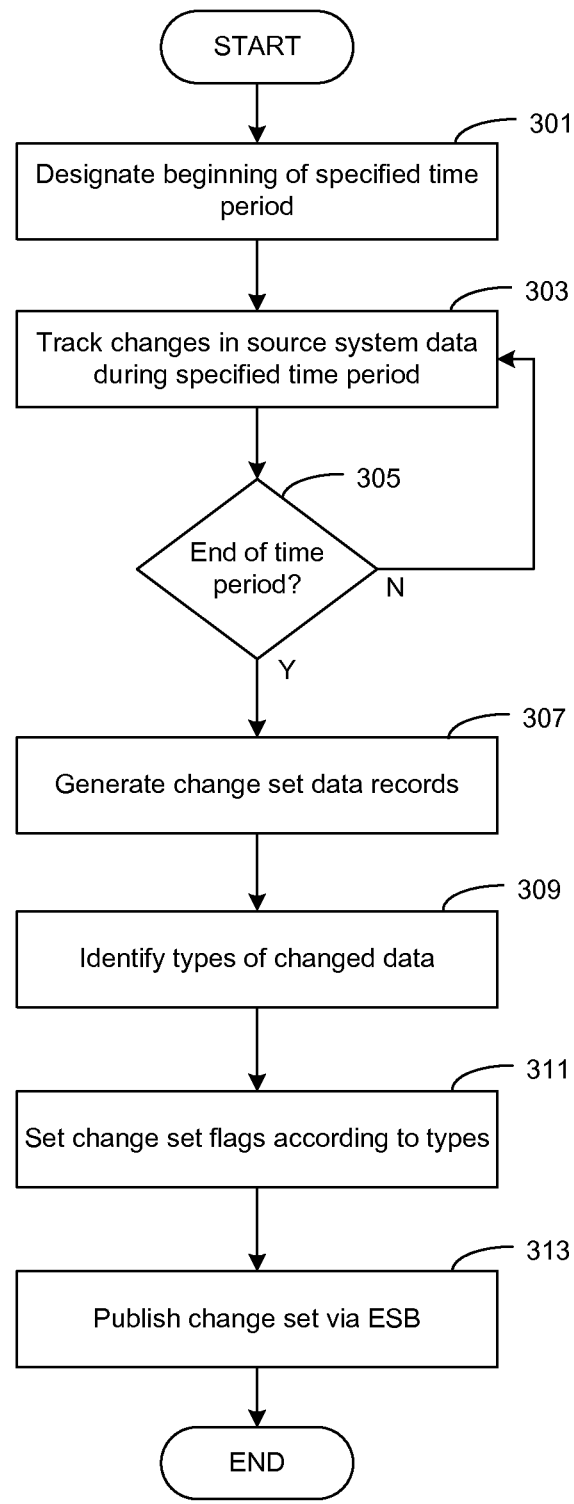
FIG. 3 is a flowchart illustrating one example of functionality implemented as portions of the data synchronization application executed in a computing device in the environment of FIG. 1 according to various embodiments of the present disclosure.

Referring next to FIG. 3, shown is a flowchart that provides one example of the operation of a portion of the data synchronization application 119 according to various embodiments. It is understood that the flowchart of FIG. 2 provides merely an example of the many different types of functional arrangements that may be employed to implement the operation of the portion of the data synchronization application 119 as described herein. As an alternative, the flowchart of FIG. 2 may be viewed as depicting an example of steps of a method implemented in the computing device 103 (FIG. 1) according to one or more embodiments.

First, in box 301, the data synchronization application 119 can designate the beginning of a specified time period. In some embodiments, the beginning of the specified time period can be a point in time at which a previous change set 121 of a particular class of change set 121 has been generated. In box 303, the data synchronization application 119 can begin tracking and/or monitoring changes to source system data for a particular class of change set 121. In box 305, the data synchronization application 119 can determine whether the end of the designated time period has been reached. In some embodiments, change sets 121 can be generated daily. Therefore, in this example, after expiration of one day, the data synchronization application 119 can determine that the end of the designate time period has been reached.

Accordingly, in box 307, upon reaching the end of the specified time period, the data synchronization application 119 can generate change set data records that correspond to data that has changed during the specified time period. In box 309, the data synchronization application 119 can identify the types of changed data in the change set, and in box 311, set change set flags corresponding to the types of changed data. Finally, in box 313, the data synchronization application 119 can publish the change set via the ESB 113.

Figure 4:
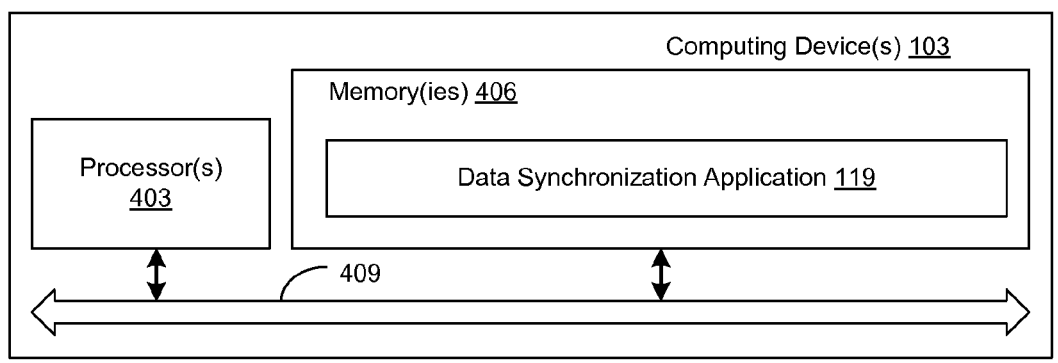
FIG. 4 is a schematic block diagram that provides one example of a computing device in which a data synchronization application can be implemented in the environment of FIG. 1 according to various embodiments of the present disclosure.

With reference to FIG. 4, shown is a schematic block diagram of the computing device 103 that may implement the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are an operating system 405, the data synchronization application 119, and potentially other applications. It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, SQL or any other programming or scripting languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components.

Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the data synchronization application 119 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 3 show the functionality and operation of an implementation of portions of the data synchronization application 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data synchronization application 119, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   identifying, in at least one computing device, information corresponding to a plurality of advanced metering infrastructure (AMI) metering devices, the information having changed during a specified period of time, the information comprising energy information;
   extracting, in the at least one computing device, the energy information from an advanced metering infrastructure (AMI) head-end, the energy information associated with at least a subset of the AMI metering devices;
   generating, in the at least one computing device, an energy usage change set, wherein the energy usage change set consists of a change set identifier, a change set type, at least one flag indicating the energy information within the energy usage change set, and a plurality of records associated with the energy information changed during the specified period of time with respect to the plurality of AMI metering devices, wherein the change set type indicates a type of data change that has occurred during the specified period of time, wherein the change set identifier represents an unique identifier with respect to a plurality of previously generated change sets;

publishing the energy usage change set on an enterprise service bus.

2. The method of claim 1, wherein extracting the energy information from the AMI head-end further comprises monitoring a log file updated by the AMI head-end when the energy information is updated.

3. The method of claim 1, wherein extracting the energy information from the AMI head-end further comprises receiving an update notification from a database, wherein the update notification comprises an indication of a change in the enerqy information.

4. The method of claim 1, wherein the at least one flag further comprises an energy usage flag.

5. The method of claim 1, wherein the information corresponding to the AMI metering devices comprises device information, and the method further comprises:

extracting, in the at least one computing device, the device information from the AMI head-end, the device information corresponding to data about utility metering devices that has changed during the specified period of time;

generating, in the at least one computing device, a device information change set corresponding to the changed device information; and publishing the device information change set on the enterprise service bus.

6. The method of claim 1, wherein the plurality of records corresponds to a respective utility metering device.

7. The method of claim 1, further comprising extracting, in the at least one computing device, device information from the AMI head-end, the device information corresponding to data about utility metering devices that has changed during the specified period of time;

generating, in the at least one computing device, a device information change set corresponding to the changed device information; and publishing the device information change set on the enterprise service bus.

8. The method of claim 7, wherein the device information further comprises at least one event associated with a metering device in an AMI metering deployment.

9. The method of claim 7, wherein the device information change set further comprises a plurality of device records corresponding to a respective utility metering device, and generating the device information change set further comprises setting at least one device flag in each of the plurality of device records identifying a type of device change that has occurred during the specified period of time.

10. The method of claim 9, wherein the at least one device flag in each of the plurality of device records further comprise: a meter installation flag, an address change flag, a move-in flag, a move-out flag, a meter removal flag, a meter swap flag, a rate change flag, and an estimated meter reading flag.

11. The method of claim 1, further comprising:

extracting, in the at least one computing device, customer information from a customer information system in communication with the at least one computing device via a network, the customer information corresponding to data about at least one customer account that has changed during the specified period of time;

generating, in the at least one computing device, a customer information change set, wherein the customer information change set comprises a customer set identifier, a customer set type indicating a customer classification group, at least one customer flag indicating the customer information changed within the customer information change set, and a plurality of customer records associated with the customer information changed during the specified period of time, wherein the customer set identifier represents an unique identifier with respect to the plurality of previously generated change sets; and publishing the customer information change set on an enterprise service bus.

12. The method of claim 11, wherein the customer information further comprises at least one of: a rate plan associated with the customer account or an AMI metering identifier associated with the customer account.

13. A system, comprising:

at least one computing device; and a data synchronization application executed in the at least one computing device, wherein the data synchronization application, when executed, causes the at least one computing device to least:

identify information corresponding to a plurality of advanced metering infrastructure (AMI) metering devices, the information having changed during a specified period of time, the information comprising energy information;

extract the energy information from an advanced metering infrastructure (AMI) head-end, the energy information associated with at least a subset of the AMI metering devices;

generate an energy usage change set, wherein the energy usage change set consists of a change set identifier, a change set type, at least one flag indicating the energy information within the energy usage change set, and a plurality of records associated with the energy information changed during the specified period of time with respect to the plurality of AMI metering devices, wherein the change set type indicates a type of data change that has occurred during the specified period of time, wherein the change set identifier represents an unique identifier with respect to a plurality of previously generated change sets; and publish the energy usage change set on an enterprise service bus.

14. The system of claim 13, wherein extracting the energy information from the AMI head-end further causes the at least one computing device to at least monitor a log file updated by the AMI head-end when the energy information is updated.

15. The system of claim 13, wherein extracting the energy information from the AMI head-end further causes the at least one computing device to at least receive an update notification from a database.

16. The system of claim 13, wherein the at least one flag further comprises an energy usage flag.

17. The system of claim 13, wherein the information corresponding to the AMI metering devices comprises device information, and the data synchronization application further causes the at least one computing device to at least:

extract the device information from the AMI head-end or a meter data management system, the device information corresponding to data about utility metering devices that has changed during the specified period of time;

generate a device information change set corresponding to the changed device information; and publish the device information change set on the enterprise service bus.

18. The system of claim 13, wherein the plurality of records corresponds to a respective utility metering device.

19. The system of claim 13, wherein the data synchronization application further causes the at least one computing device to at least:
- extract device information from the AMI head-end, the device information corresponding to data about utility metering devices that has changed during the specified period of time;
- generate a device information change set corresponding to the changed device information; and
- publish the device information change set on the enterprise service bus.

20. The system of claim 19, wherein the device information further comprises at least one event associated with a metering device in an AMI metering deployment.

21. The system of claim 19, wherein the device information change set further comprises a plurality of device records corresponding to a respective utility metering device, and generating the device information change set further causes the at least one computing device to set at least one device flag in each of the plurality of device records identifying a type of change that has occurred during the specified period of time.

22. The system of claim 21, wherein the at least one device flag in each of the records further comprises: a meter installation flag, an address change flag, a move-in flag, a move-out flag, a rate change flag, a meter removal flag, a meter swap flag, or an estimated meter reading flag.

23. The system of claim 13, wherein the data synchronization application further causes the at least one computing device to at least:
- extract customer information from a customer information system in communication with the at least one computing device via a network, the customer information corresponding to data about at least one customer account that has changed during the specified period of time;
- generate a customer information change set corresponding to the changed customer information, wherein the customer information set comprises a customer set identifier, a customer set type indicating a customer classification group, at least one customer flag indicating the customer information changed within the customer information change set, and a plurality of customer records associated with the customer information changed during the specified period of time; and
- publish the customer information change set on an enterprise service bus.

24. The system of claim 23, wherein the customer information further comprises at least one of: a rate plan associated with the customer account or an AMI metering identifier associated with the customer account.

\* \* \* \* \*